United States Patent [19]

Maloney

[11] Patent Number: 4,723,455
[45] Date of Patent: Feb. 9, 1988

[54] MECHANICAL VARIABLE SPEED DRIVE

[75] Inventor: Joseph J. Maloney, Hartsville, Ind.

[73] Assignee: Reliance Electric Company, Greenville, S.C.

[21] Appl. No.: 917,723

[22] Filed: Oct. 10, 1986

[51] Int. Cl.⁴ ...................... F16H 29/20; F16H 15/08
[52] U.S. Cl. ..................................... 74/89.15; 74/199; 74/212; 74/841
[58] Field of Search .............. 74/199, 841, 212, 89.15; 200/47; 474/40

[56] References Cited

U.S. PATENT DOCUMENTS

| | | | |
|---|---|---|---|
| 1,590,570 | 6/1926 | Flack et al. | 74/89.15 |
| 2,806,690 | 9/1957 | Miles | 74/89.15 |
| 3,220,718 | 11/1965 | Wikkerink | 74/89.15 |
| 3,221,118 | 11/1965 | Hoover | 200/47 |
| 3,418,863 | 12/1968 | Landau | 474/40 |
| 3,523,599 | 8/1970 | Denkowski | 200/47 |
| 3,528,303 | 9/1970 | Haller | 74/89.15 |
| 3,792,619 | 2/1974 | Cannon et al. | 74/89.15 |
| 4,137,432 | 1/1979 | Kamm | 200/47 |
| 4,370,139 | 1/1983 | Zigler | 474/45 |
| 4,384,863 | 5/1983 | Huff et al. | 474/28 |

FOREIGN PATENT DOCUMENTS

| | | | |
|---|---|---|---|
| 0132944 | 8/1982 | Japan | 74/89.15 |
| 0464177 | 4/1937 | United Kingdom | 74/199 |
| 1435994 | 5/1976 | United Kingdom | 74/199 |
| 0616660 | 6/1978 | U.S.S.R. | 200/47 |

OTHER PUBLICATIONS

Disctrac Technical Guide Brochure, Reliance Electric ©1985, and Manufacturer's Drawings 2.3 and 5.7 related thereto.

*Primary Examiner*—Leslie Braun
*Assistant Examiner*—Scott J. Anchell
*Attorney, Agent, or Firm*—Dority & Manning

[57] ABSTRACT

An electric motor changes the output speed of a mechanically-adjustable variable speed drive apparatus by controlled bi-directional rotation of a shifting screw engaged with a centerpiece assembly. In general, the dry traction apparatus may be either of the single disk or double disk type (including modifications thereof). The motor drive shaft is co-axially aligned and coupled with the shifting screw, and includes a particular thrust bearing arrangement which accepts axial thrust in either direction generated by rotational operation of such motor. A limit switch mechanism, including a spring-loaded limit switch actuation element, also automatically controls motor operation by responding to controlled shifting of the centerpiece element. A protective shear pin and a torque arm arrangement further facilitate co-axial coupling of the motor with the shifting screw. An output friction ring of the drive apparatus may optionally be outfitted with a tachometer ring to facilitate monitoring of the output rotational speed.

27 Claims, 6 Drawing Figures

MECHANICAL VARIABLE SPEED DRIVE

BACKGROUND OF THE INVENTION

This invention generally concerns a mechanically-adjustable variable speed drive, and in particular the improved combination of a dry traction type mechanical variable speed drive apparatus with electric remote control for actuating same.

A number of commercial devices and processes require variable speed power inputs, while constant speed electric motors are generally cheaper and more rugged and reliable than variable speed electric motors. Mechanically-adjustable variable speed drives are known for coupling between constant speed motors and devices requiring variable speed power inputs. In effect, the variable speed drive is used to change the output speed of the electric motor as needed for the device being driven. In actuality, mechanical linkages of the drive apparatus are altered so that the output speed of the variable speed drive is controllably varied relative the constant speed input thereof.

One example of a mechanical adjustable speed drive is the DISCTRAC dry traction, disc-type drive distributed by the present assignee. In general summary, such adjustable speed drive has a housing with co-axially aligned input and output, and uses a dual pair of friction discs/rings. A first friction disc and friction ring are associated with the input and output, respectively. Another respective friction ring and friction disc are carried on opposing ends of a movable centerpiece element and associated at slight angles with the input friction disc and output friction ring, respectively. A handwheel may be used to manually rotate a shifting screw threadably engaging the centerpiece element so as to shift its friction disc and ring relative the co-axially aligned input and output. The radii of respective contact areas between the disc/ring pairs is thereby altered, which results in speed variation of the drive output relative the input thereof.

In another embodiment of such DISCTRAC apparatus, the handwheel (mechanical variator) is replaced with a bi-directional electric motor (electrical variator) coupled by a right-angle worm gear drive arrangement to the shifting screw. The motor controllably rotates the shifting screw to in turn adjust the output speed of the drive apparatus relative the input thereof.

Furthermore, alternative basic configurations of dry traction, disc-type devices are known. For example, a configuration using a single pair of friction disc and ring generally replaces the abovementioned sliding centerpiece element and its ring/disc pair with a controllably positioned drive motor which is also shifted relative the housing drive train for the purpose of varying output speed versus input speed, as understood by those of ordinary skill in the art. Such drive motor may be physically shifted with mechanical (e.g. handwheel) actuation or a right-angle worm gear electric motor arrangement, similar to the "electric" DISCTRAC embodiment. Present reference throughout to a dry traction disc-type mechanical adjustable speed drive apparatus is generally intended to refer to any and all modifications and variations of such basic apparatus.

SUMMARY OF THE PRESENT INVENTION

While the previous devices provide considerable flexibility and utility for a variety of drive applications, the present invention generally concerns an improved adjustable speed drive including an electrical variator (e.g. electric motor) for electrically changing the output speed of the adjustable drive.

In general, it is an object of this invention to provide a mechanically-adjustable variable speed drive apparatus of a dry traction type, with an electric motor assembly for providing electric remote control actuation thereof. Further, the present invention is intended to accommodate a variety of particular installation requirements, especially those including tight size restrictions.

More particularly, it is an object of this invention to provide an electric variator including a controllable electric motor having a drive shaft which is co-axially coupled with a shifting screw (or analogous element) of a dry traction, disc-type mechanically-adjustable variable speed drive apparatus. It is a further present object to provide a thrust bearing arrangement particularly suited for accommodating thrust conditions occurring with an electric motor having a drive shaft co-axially coupled with a shifting screw of such type of variable speed drive apparatus.

Still another object of the present invention is to provide an electric remote control mechanically-adjustable variable speed drive apparatus generally of the dry traction type, and further including more particular features directed to improved operation of an electric actuator with such type of drive apparatus. In general, such features may optionally include (but are not limited to) various combinations of limit switch arrangements for automatically limiting operation of the electric motor, a protective shear pin arrangement for protecting the motor and the drive apparatus from hazardous torque conditions, and a torque arm arrangement for facilitating support of the electric motor while preventing rotation of such electric motor about its shaft during its operation.

Details of such objects and features of the present invention, as well as other features thereof, are set forth more particularly in the following specification. Various modifications, substitution of equivalents, and the like for such features and elements of the invention will be apparent to those of ordinary skill in the art. All such modifications and variations are intended to come within the spirit and scope of the present invention, by virtue of present reference thereto.

While particular features and elements disclosed herein may be provided in various combinations to form given embodiments in accordance with the present invention, several particular exemplary embodiments (i.e. combinations) are discussed below. In general, embodiments of this invention include combinations of a controllable electric motor with a dry traction-type, mechanically-adjustable variable speed drive apparatus, including for example those of the type more particularly discussed in detail below with reference to application FIG. 1.

One exemplary embodiment of this invention includes a dry traction-type variable speed drive apparatus; and a controllable electric actuation means, having a drive shaft coupled to and substantially co-axial with a shifting means, for controllably actuating same so as to vary the housing output rotational speed relative the input thereof; and thrust bearing means, associated with coupling between the electric actuating means drive shaft and the shifting means, for accepting thrust in either axial direction along such drive shaft and shifting means caused by operation of the electric actuation means; whereby mechanically-adjusted speed variation is controllably accomplished with an electric remote control device disposed co-axial with the shifting means.

Yet another exemplary embodiment of this invention generally includes a mechanical adjustable speed drive apparatus; and controllable motor means having a drive shaft coupled in substantially axial alignment with a shifting means for rotating same to vary the rotation speed of a drive apparatus output relative an input thereof; motor limit switches, operatively associated with the motor means, for limiting the range of controlled shifting of a centerpiece means by actuation of the shifting means with the motor means; and a limit switch actuation element, biased towards an upper shoulder of the centerpiece means so as to move with same, for actuating the motor limit switches responsive to the controlled shifting of such centerpiece means; whereby mechanically-adjusted speed variation is controllably accomplished within a defined range with a controllable motor means.

BRIEF DESCRIPTION OF THE DRAWINGS

A complete and enabling description of the present invention, including the best mode thereof, may be understood upon studying the following detailed specification, particularly with reference to the attached figures, in which.

Figure 1:
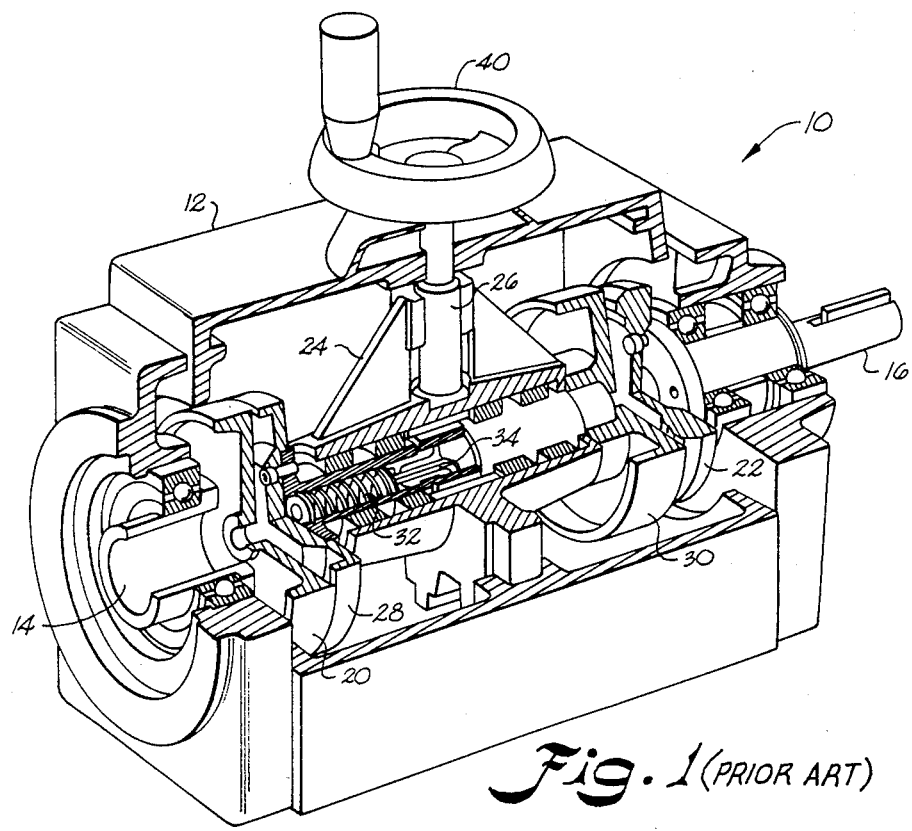
FIG. 1 generally represents one example of a prior art dry traction, disc-type (dual disc/ring pair) mechanical adjustable speed drive apparatus, including a handwheel manual variator mechanism.

Repeat use of reference characters throughout the following specification and attached figures is intended to represent the same or analogous elements or features of the present invention.

DETAILED DESCRIPTION OF THE PREFERRED EMBODIMENT

FIG. 1 represents one example of a known dry traction, disc-type (dual pair of friction disc/ring) mechanical adjustable speed drive apparatus. Other basic configurations are known, as referenced above in the Background of the invention. In general, virtually all aspects of the present invention may be practiced in combination with any of the different configurations of dry traction-type variable drive apparatuses.

Variable drive apparatus 10 includes a relatively enclosed main housing 12 with an input 14 thereto and an output shaft 16 co-axial with such input along a main axis (i.e. drive train) of housing 12. Typically, a constant speed drive input (e.g. a single speed electric motor) will be coupled with input 14, and output shaft 16 will be coupled with a commercial apparatus for varied input drive speed.

Approximately a 90° segment of housing 12 is partially cut away to more clearly illustrate drive train features thereof. First friction disc 20 cooperates with input 14 for rotation therewith, while first friction ring 22 is disposed for rotation with output 16. Centerpiece element 24 threadably engages a shifting screw 26 (the threading of which is not illustrated in FIG. 1 for the sake of clarity), rotation of which causes centerpiece element 24 to move in a direction substantially perpendicular to the drive train of housing 12. Second friction ring 28 and second friction disc 30 are rotatably mounted on opposing axial ends of centerpiece element 24, and are drivingly coupled by a spring member 32 and torque sensing cam 34 received within a central channel of centerpiece element 24. Further details of such arrangement are known to those of ordinary skill in the art, and are not required for an understanding of the present invention.

In general, centerpiece element 24 supports the surfaces of ring 28 and disc 30 at a slight angle with respect to the surfaces of their paired disc and ring, such that controlled shifting of centerpiece element 24 relative the main axis of housing 12 causes a change in the radii of contact areas between such friction ring and disc pairs, as known in the art. Such controlled shifting of centerpiece element 24 is accomplished in the exemplary prior art embodiment of FIG. 1 by manual actuation of handwheel 40. A shaft of handwheel 40 is coupled with shifting screw 26 for rotating same in either direction. Rotation of screw 26 obviously moves centerpiece element 24 up and down. The range of such centerpiece element movement is related to the range of speed variation for drive apparatus 10.

Various bearings and the like which support and seal along the main axis of housing 12 are known in the art and do not form particular features of the present invention; thus, such are not discussed in detail.

Figure 2:
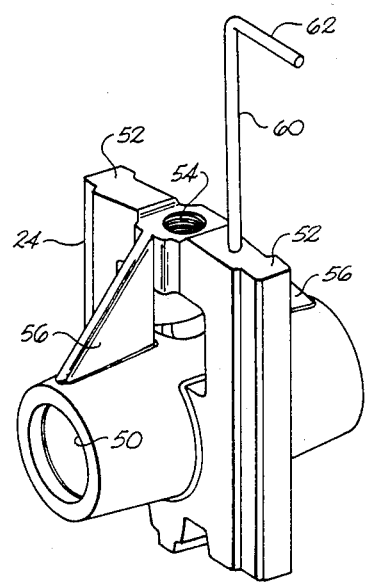
FIG. 2 illustrates a perspective side view of a movable centerpiece element, and a limit switch actuation element, in accordance with the present invention.

FIG. 2 illustrates a full, perspective side view of centerpiece element 24, which is illustrated as partially cutaway in FIG. 1. Generally circular channel 50 is adapted for receipt of spring 32 and torque sensing cam 34 (FIG. 1). A pair of boss-type upper shoulders 52 engage the interior of housing 12 to provide a stop for upward movement of centerpiece 24. Threaded opening 54 engages shifting screw 26 in a central portion between the two shoulders 52. A pair of triangular support braces 56 (one of which is partially hidden from view by the illustration of FIG. 2) bridge between such central region and channel 50. In general, FIG. 2 illustrates a known construction for a centerpiece element 24.

In accordance with one aspect of the present invention, a bar-type limit switch actuation element 60 is disposed relative centerpiece element 24 so as to engage part of element 24, e.g. one of the upper shoulders 52 thereof. Element 60 is L-shaped, as illustrated, and has an upper portion 62 which projects transversely outward so as to actually engage limit switches (shown more fully with reference to FIGS. 3 and 4), which in turn limit operation of an electric actuator means (e.g. an electric motor). Though usually not joined to element 24, rod 60 is preferably biased against same so as to move therewith. Thus, actuation of limit switches may be generally associated with controlled shifting of centerpiece element 24.

Figure 3:
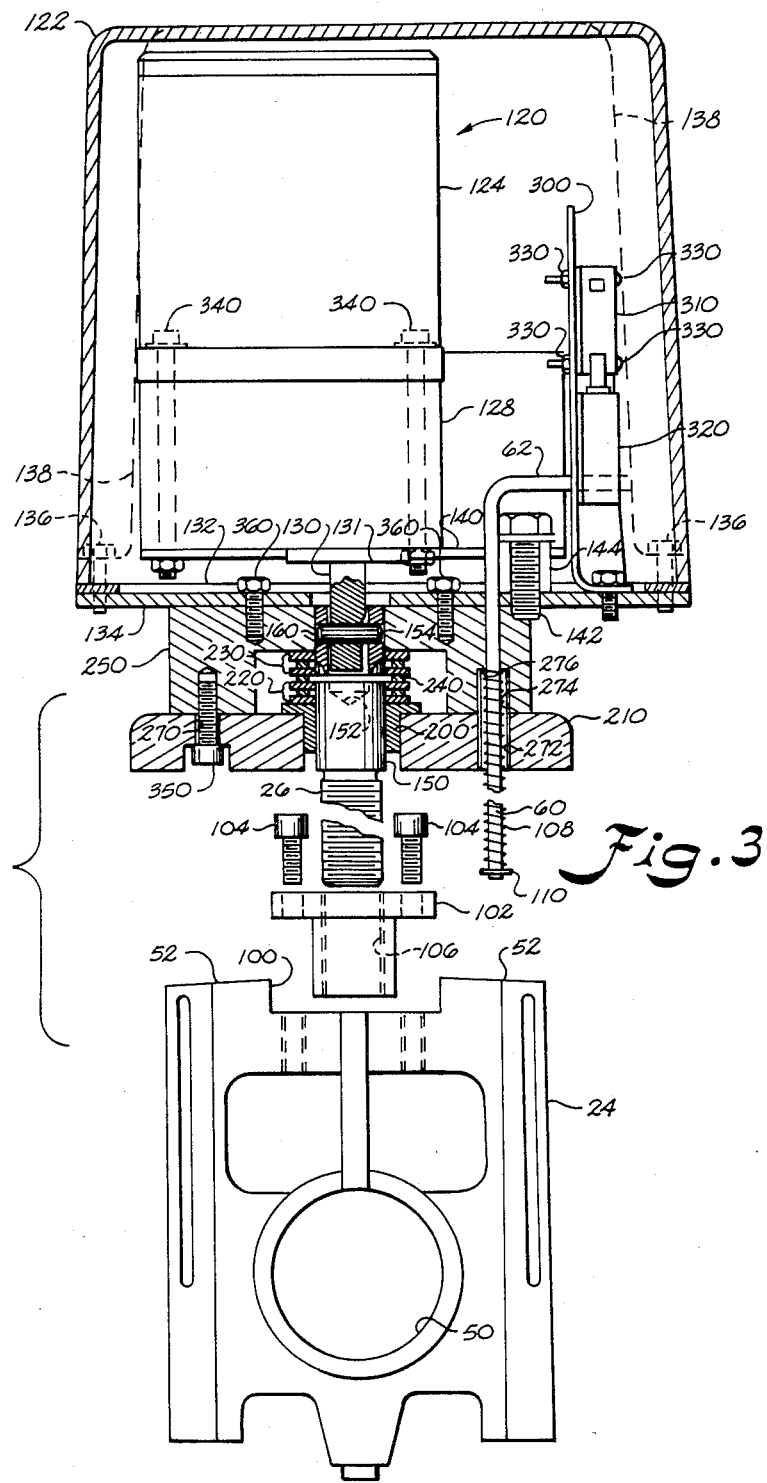
FIG. 3 illustrates a partially-exploded side view of an electric variator and various features thereof associated with a shifting screw and a centerpiece element, in accordance with the present invention.

The exemplary embodiment of FIG. 3 illustrates one example of an electrical variator in accordance with the present invention for electrically shifting centerpiece element 24 by controlled rotation of screw 26. Various optional features are also generally illustrated. For example, centerpiece 24 may be coupled with screw 26 through an insert. An opening 100 formed in the upper surface of centerpiece element 24 receives such insert 102 secured by bolts 104 or the like. A central, threaded opening 106 in the insert receives screw 26.

Preferably, insert 102 may be formed of a metal having dissimilar hardness from that of centerpiece element 24 or shifting screw 26. Metals of like hardness tend to suffer from galling, which can lead to undesirable lock-up between screw 26 and element 24. According to the present invention, insert 102 preferably comprises a metal such as a half-hardened bronze, while the shifting screw and centerpiece element comprise relatively hardened materials. With such an arrangement, wear will be generally absorbed by the relatively softer material of the insert instead of the shifting screw or the centerpiece. As needed, the insert may then be simply replaced, without requiring more difficult and expensive replacement of the shifting screw or centerpiece element.

FIG. 3 is partially exploded to illustrate cooperation of the centerpiece elements with the remainder of the indicated structure. Limit switch actuation element 60 is ordinarily biased by spring 108 so as to engage and ride on an upper shoulder 52 of centerpiece element 24 (FIG. 2). Since element 60 is relatively lightweight, not much spring biasing is required to accomplish such function; hence, a simple slip-on nut 110 or the like is sufficient to retain spring 108 about actuation element 60. Obviously, other functionally equivalent arrangements for detecting centerpiece element movement and actuating electric motor limit switches may be used without departing from the spirit of this invention. Alternatively, limit switches could be made responsive to motor operation other than by responding to centerpiece element movement.

In general, FIG. 3 illustrates the replacement of handwheel variator 40 of FIG. 1 with an electrical variator including an electric motor 120. Such electric motor preferably comprises a bi-directional, controllable gearmotor, mostly enclosed within a motor housing 122, and having an electric motor portion 124 (e.g. servomotor) coupled by bolts 126 to a gear portion 128. Alternatively, motor 120 need not be bidirectional, but could be uni-directional and coupled with its output shaft 130 through a reversible coupling so that shaft 130 could be selectively rotated in either direction. Drive shaft 130 projects through a sidewall (i.e. bottom) 132 of motor housing 122, and through an aligned opening formed in a bracket or base plate 134 secured to sidewall 132 with screws 136. Dotted line structures 138 represent corner indents of housing 122 for passage of screws 136, which screws also secure bottom 132 with the remainder of such housing. Such remainder thus comprises a top housing cover relative a bottom 132 thereof.

Shaft 130 is generally co-axially aligned and coupled with shifting screw 26. As illustrated by FIG. 3, lower ends of bolts 126 are normally spaced from the interior of housing 122. Thus, gearmotor 120 is supported only at its drive shaft 130, and by a torque arm arrangement, which includes bracket 140, torque arm bolt 142 and spacer element 144. In general, bracket 140 is secured to the bottom of gearmotor 120, and projects arm-like outwardly therefrom. Spacer 144 is rigidly secured relative bottom 132 and base plate 134. Spacer 144 passes through an opening in bracket 140, with a small amount of radial clearance therebetween. Bolt 142 in turn passes through spacer 144 and threadably engages base plate 134.

Such arrangement defines a torque arm which prevents gearmotor 120 from rotating about its drive shaft 130 during its operation. The radial clearance between the opening in bracket 140 and spacer 144, and the illustrated axial spacing between the head of bolt 142 and the upper surface of bracket 140, each contribute to some freedom of movement for gearmotor 120 while same is otherwise supported only at its drive shaft. Such structure accommodates small misalignments between drive shaft 130 and shifting screw 26, or minor relative movement therebetween during operation.

Drive shaft 130 is preferably coupled to a non-threaded, extended portion 150 of shifting screw 26, which extension defines a central bore 152 in an axial end thereof for receipt of the drive shaft. An additional channel 154 is formed transverse to the longitudinal axis of central channel 152, to permit receipt of a protective shear pin 160. Such shear pin also passes through an opening in drive shaft 130, and thus drivingly couples drive shaft 130 to shifting screw 26.

Various types of shear pins, such as a spiral pin or a roll pin, are known in the art, and may be used generally interchangeably. Also, shear pins generally have predetermined torque ratings above which they self-destruct so as to de-couple the elements they ordinarily join. Preferably, shear pin 160 is selected for de-coupling at a torque value selected relative to the continuous torque rating of gearmotor 120. For example, one preferred gearmotor 120 may have a continuous torque rating of 69 inch pounds at 24 RPM. Shear pin 160 should have characteristics sufficiently high to permit full-range operation of gearmotor 120, while sufficiently low to protect such motor.

Preferably, the shear pin torque rating should be a little above the continuous torque rating of the gearmotor. Such selection also permits some transitional or impulse torque values above the continuous-rating range. Torque values can exceed the continuous rating for short bursts without harming the gearmotor. Furthermore, such impulse excesses are likely to occur during consecutive reversals of the rotational direction of gearmotor 120, particularly when same is fully loaded by shifting screw 26 and centerpiece element 24. Proper selection of the torque rating of shear pin 160 permits some impulses which exceed the motor continuous rating, while still protecting same.

Co-axial alignment of an electric motor drive shaft with the shifting screw provides certain advantages relative mounting of a drive apparatus 10. For example, since there is generally no "horizontal" projection by the motor from the main drive apparatus housing, there is essentially no "overhang" of the motor relative such housing. Thus, the present arrangement will be especially suitable for drive applications where a horizontally-disposed electric motor (relative housing 12) would be impractical or otherwise undesired.

Also, drive apparatus 10 may be alternatively disposed in a variety of operative orientations. When disposed as illustrated in FIG. 1, gearmotor 120 will be in a relative vertical disposition. Whether in such vertical disposition, or in a horizontal disposition (as when housing 12 is turned on one of its sides), the co-axial coupling of gearmotor 120 with shifting screw 26 is facilitated by a particular thrust bearing arrangement in accordance with the present invention.

Such thrust bearing arrangement permits rotation of drive shaft 130 in either direction, while co-axially and drivingly coupled with its load (i.e. the shifting screw). Thrust is automatically accepted in either axial direction along the motor drive shaft. As understood by one of ordinary skill in the art, gearmotor 120 (relatively fixed by the torque arm arrangement described above) will generate thrust in either an inward or outward direction along its drive shaft 130 as the speed of such shaft alternately decelerates or accelerates, respectively.

Figure 4:
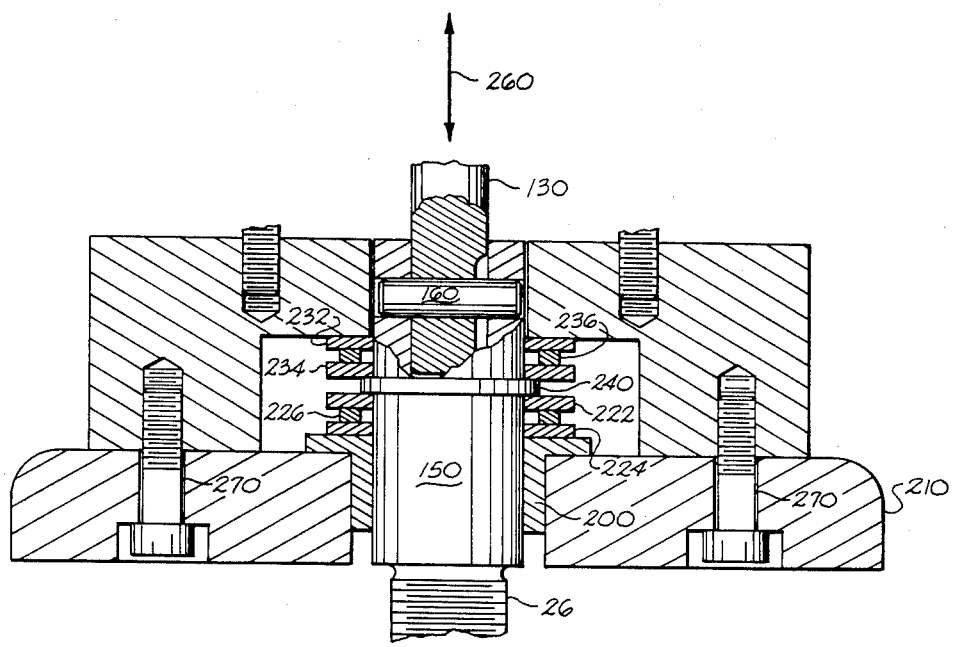
FIG. 4 illustrates an enlarged cross-sectional side view of an exemplary thrust bearing arrangement and protective shear pin, in accordance with this invention.

FIGS. 3 and 4 illustrate structure for an exemplary thrust bearing arrangement in accordance with this invention. Moving axially upward from shifting screw 26 in such illustrations, a flange bushing 200 is received about the extended portion 150 of shifting screw 26. Bushing 200 is received in an opening formed in a plate 210, which is adapted to be secured to the top of housing 12 to function as a cover plate therefor.

Above bushing 200, a pair of bearing assemblies 220 and 230 axially capture a retaining ring 240, all of which are radially disposed as annular elements about extension 150 of shifting screw 26. Of elements 220–240, only ring 240 radially engages extension 150. The axially upward face of bearing assembly 230 engages bearing housing 250, which is secured to cover plate 210, as discussed more fully below.

The enlarged view of FIG. 4 illustrates greater detail of the thrust bearing arrangement, particularly the bearing assemblies thereof. Two headed arrow 260 illustrates the two basic directions in which thrust is normally exerted along shifting screw 26 by operation of gearmotor 120. In general, bearing assemblies 220 and 230 may be identically composed of a pair of races axially capturing roller bearings received in a cage. A top race 222 and bottom race 224 axially capture roller bearings 226 so as to define lower bearing assembly 220. Similarly, a top race 232 and bottom race 234 capture roller bearings 236 so as to define upper bearing assembly 230. The respective races each have some radial clearance from extension 150 (as described above), and either rotate freely or are held stationary by frictional engagement. The bearing assemblies need not accept any type of radial load, but instead only the axial load described above.

Top race 232 and bottom race 224 frictionally engage bearing housing 250 and plate 210, respectively. Thus, races 232 and 224 remain stationary. On the other hand, snap ring or retaining ring 240 radially engages extended element 150 and axially frictionally engages races 234 and 222, so that all such elements rotate with rotation of shifting screw 26. Therefore, one race of each bearing assembly rotates while the other one remains stationary.

In general, thrust acceptance (i.e. bearing of thrust) automatically transfers between bearing assemblies 230 and 220 as the direction of such thrust shifts with changes in gearmotor operating conditions. In particular, as the speed of gearmotor 120 slows, thrust associated therewith is directed upwardly along shifting screw 26 and drive shaft 130 such that upper bearing 230 accepts the thrust load, with the top race 232 thereof stationary and the bottom race 234 thereof rotating. Alternately, when the drive shaft speed of gearmotor 120 increases, thrust is directed outwardly from the gear motor (i.e., downwardly along drive shaft 130 and shifting screw 26) so as to be accepted by lower bearing assembly 220. Typically, only one bearing assembly bears thrust at a given time.

FIGS. 3 and 4 further illustrate openings 270 in cover plate 210, generally for coupling of such plate with bearing housing 250 (discussed further below with reference to FIG. 5). FIG. 3 illustrates how one such opening 272 may be particularly adapted for passage of switch means actuation element 60 and spring 108 therethrough. In such instance, bearing housing 250 may define an opening 274 therethrough for further receipt of such members, with spring 108 being captured therein against a shoulder 276 thereof. Shoulder 276 cooperates with nut 110 to provide structure permitting spring 108 to bias member 60 towards shoulder 52 of centerpiece element 24.

Such biasing causes the lower end of element 60 to engage shoulder 52 of centerpiece element 24, and be controllably shifted therewith. In turn, an upper end 62 of element 60 extends transversely from its lower end so as to traverse a pathway generally parallel with bracket 300, mounted inside housing 122 for support of limit switches 310 and 320. The precise axial displacement of limit switches 310 and 320 along such pathway may be adjusted by means of nut and bolt pairs 330, which selectively attach such limit switches to bracket 300.

Actuable portions (not shown in FIG. 3) of limit switches 310 and 320 project into the pathway of extended element 62. Thus, as centerpiece element 24 is controllably shifted to change the drive apparatus output speed relative its input speed, limit switches 310 and 320 (operatively associated with control features of gearmotor 120, as understood) are actuated by element 62 to prevent gearmotor 120 from driving centerpiece element 24 beyond a determined range of movement therefor. The construction and structure of FIG. 3 is more fully understood from the top plan view thereof illustrated by present FIG. 5 (shown essentially with the top housing cover of housing 122 removed).

In general, limit switches 310 and 320 comprise upper and lower limit switches, respectively. Upward movement of centerpiece element 24 causes limit switch 310 to be engaged by extended member 62. Similarly, lower limit switch 320 is actuated as centerpiece element 24 reaches the lower end of its desired movement range. In either instance, actuation of one of the respective limit switches causes gearmotor 120 to stop rotating in its present direction of operation, and such prevention of further rotation serves to prevent centerpiece element 24 from exceeding its predetermined limits.

Figure 5:
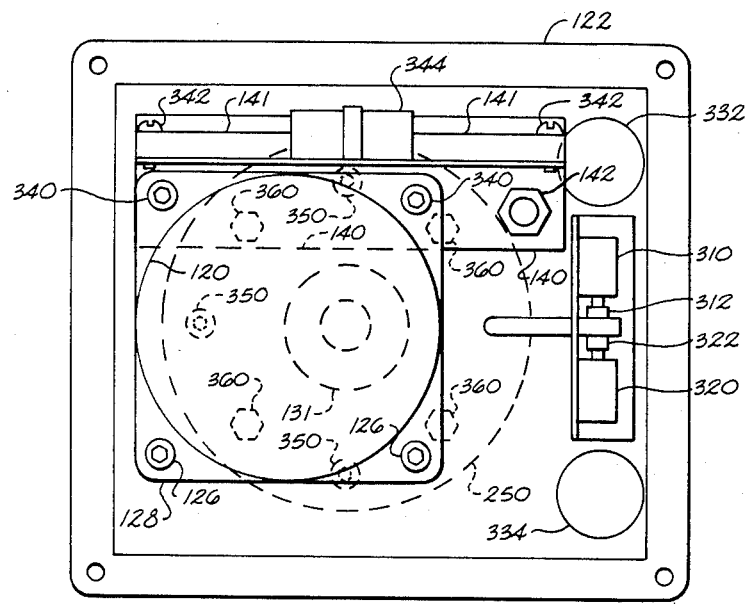
FIG. 5 illustrates generally a top, plan view of the FIG. 3 exemplary embodiment.

FIG. 5 illustrates one preferred placement of limit switches 310 and 320, wherein such switches are staggered and placed on opposing sides of the pathway for extended actuator member 62. Actuable elements 312 and 322, respectively, of such limit switches extend into such pathway for selective engagement by movement of extended actuator member 62 directly responsive to controlled shifting of centerpiece element 24.

As further illustrated by FIG. 5, shaft 130 is generally off-set from the center of motor 120. The lower gear part 128 of gearmotor 120 is essentially rectangular-shaped. In contrast, bearing housing 250 (associated with the present thrust bearing arrangement) is generally circular, as is the small jacket portion 131 which is part of gearmotor 120 and receives a bearing which surrounds drive shaft 130 of motor 120. Such jacket is partially obscured in the FIG. 3 view by the lower end of one bolt 126 but its circular nature and position relative shaft 130 is fully illustrated in FIG. 5.

Openings 332 and 334 comprise passageways which permit control and power wires (not shown) to pass into housing 122 for operative association with gearmotor 120. Bracket 140 (secured to the bottom of gearmotor 120 with bolts 340) also has a portion 141 which projects upwardly along a side of such motor so as to comprise a terminal strip adapted for receipt of the wires passing through openings 332 and 334. Screws 342 are associated with such terminal strip portion 141 of bracket 140. Element 344, also received on such terminal strip portion 141 of bracket 140, generally represents a capacitive element for operative association with gearmotor 120. Torque arm screw 142 is illustrated in relation with that portion of bracket 140 which attaches to the bottom of gearmotor 120.

Additional connecting elements such as various screws and bolts are illustrated throughout FIG. 5, and are generally described as follows. Circular head screws 350 are for securing cover plate 210 with bearing housing 250, and pass through openings 270 of such base plate 210. Hex head screws 360 couple base plate 134 with bearing housing 250.

Referring to FIG. 1, output friction ring 22 is fixed relative output shaft 16 for rotation therewith. In certain commercial processes, it is desired to monitor the input speed of a commercial apparatus. In a typical drive configuration as discussed generally above, the rotational speed of output shaft 16 will be the same as the rotational input power drive to a given commercial device. Thus, tachometer devices associated with output friction ring 22 or analogous elements will provide the desired rotational speed information.

Figure 6:
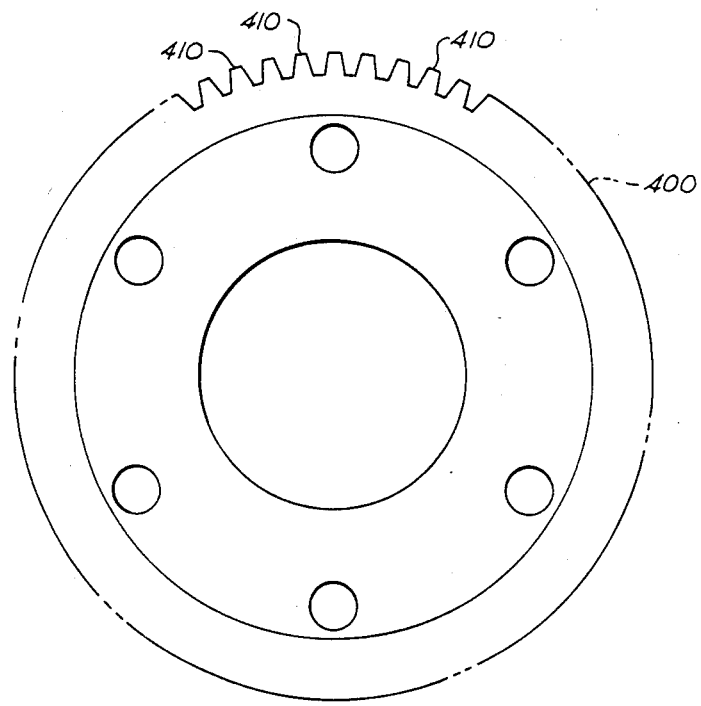
FIG. 6 illustrates a side, plan view of an annular tachometer member or ring secured about a drive apparatus element, in accordance with the present invention.

Present FIG. 6 illustrates one possible modification to friction ring 22 which may be made in accordance with the present invention to adapt same for providing a tachometer output. An annular member or ring 400 is provided with a plurality of equally spaced serrations 410 about the periphery thereof, and then press fit with an interference fit onto the outer diameter of friction ring 22. Alternatively, tachometer ring 400 may be lightly pressed onto output friction ring 22, and then welded into place. Also, the number and precise design of the serrations may be varied. It is preferred that 60 serrations equally spaced as shown be provided about the entire periphery of ring 400, and used to produce tachometer outputs in a known fashion (such as with a magnetic sensor) for forming an input for a tachometer device.

While the foregoing has generally set forth features and aspects of the present invention, various particular embodiments thereof may be practiced without departing from its scope or spirit thereof. For example, tachometer ring 400 may be formed from powdered metal with the peripheral serrations thereof initially provided during the forming process, or some other metal such as a mild steel may be initially formed as a "blank" (ie. with no serrations thereon) and the teeth then hobbed thereon.

Also, the overall dimensions of all the elements in FIG. 1 may be collectively varied to provide different sized embodiments, and the more particular elements of the present invention in combination therewith also varied accordingly. For example, the outside diameter of friction ring 22 may vary from about 2.8 to about 4.4 inches, with the outside diameter of tachometer ring 400 similarly varying between 3.3 inches and about 5.2 inches.

As further example, the axial capturing distance between bearing housing 250 and cover plate 210 may be about three quarters of an inch, depending on the thicknesses of the individual bearing assembly components. Typically, such components may have the same inside and outside diameters, but vary in thickness depending on the magnitude of anticipated axial forces.

Also the precise composition of gearmotor 120 need not be limited. Certain features are however preferred. For example, it is preferred that such gear motor be bi-directional. Other features may optionally be used, such as built-in thermal protection, which would function separately from the foregoing described protective shear pin so as to protect the motor. Also, while a single housing 122 is illustrated for generally enclosing motor 120, the torque arm arrangement relative thereto, the limit switch configuration, and a portion of the limit switch actuation member, other housing arrangements may be provided in accordance with the present invention. For example, the limit switch arrangement might be separately enclosed from the housing which receives the motor itself.

Still, other aspects of this invention need not be limited to specific physical dimensions, even though certain dimensions might be preferred. For example, it is desired that the head of bolt 142 be initially spaced about one-eighth of an inch above the nominal placement of bracket 140, to prevent binding of gearmotor 120. The actual gap may vary, while maintaining the overall support features illustrated for gearmotor 120 and the torque arm arrangement relative thereto. As a further example, the distance from the center of the axis of shifting screw 26 to the center of bolt 142 may be approximately two to two and a half inches. Such length actually corresponds to the torque arm which functions to hold gear motor 120 relatively fixed during its operation.

In summary, those of ordinary skill in the art will recognize the many advantages flowing from the presently disclosed improved mechanical adjustable speed apparatus with electric variator. Furthermore, particularly with reference to the thrust bearing arrangement presently disclosed, the present configuration provides an efficient and advantageous support structure for an electric variator, sufficient for up to 70% duty cycle operation. In other words, gearmotor 120 may be operated up to as much as about 70% of a given time period, such as a one minute time base. Also the thrust bearing arrangement permits efficient operation in either rotational direction of the gearmotor.

Modifications and variations to the presently disclosed exemplary embodiment, suggested above or otherwise, are intended to come within the spirit and scope of the present invention. Furthermore, the description of the exemplary embodiment set forth above is intended as words of description and example only, and not words of limitation, which are set forth only in the appended claims.

What is claimed is:

1. A mechanical variable speed drive apparatus, comprising:
   a main housing having a rotatable input and a rotatable output generally co-axially aligned along a drive train thereof, said input adapted to be powered;

dry traction friction power transmission means, generally in axial alignment with said drive train, and respectively connected to said housing input and output for transmitting power therebetween;

centerpiece means, disposed generally along said drive train and slidably mounted within said housing for controllable movement substantially perpendicular to said drive train thereof, for varying the rotational power transmitted by said power transmission means between said housing input and output;

shifting means, operatively associated with said centerpiece means and mounted generally perpendicularly to said drive train, actuation of said shifting means resulting in controlled shifting of said centerpiece means substantially perpendicular to said drive train, whereby rotational speed of said housing output relative said input thereof is varied;

controllable electric motor actuation means, having a drive shaft coupled to and substantially co-axial with said shifting means, for controllably actuating same so as to vary said housing output rotational speed relative said input thereof;

motor housing means for generally enclosing said motor actuation means, said motor housing means being substantially fixedly supported on said main housing;

torque arm means, extending radially outward from said motor actuation means into limiting engagement with said motor housing means, for preventing rotation of said motor actuation means during rotation of said drive shaft thereof, while said motor actuation means is otherwise supported on only an axial end of said drive shaft thereof coupled with said shifting means, so as to tolerate some degree of mis-alignment therebetween, and whereby some axial and radial movement of said motor actuation means relative said housing therefor is accepted; and thrust bearing means, associated with coupling between said electric motor actuation means drive shaft and said shifting means, for accepting thrust in either axial direction along said drive shaft and said shifting means caused by operation of said electric motor actuation means;

whereby mechanically-adjusted speed variation is controllably accomplished with an electric remote control device disposed co-axial with said shifting means.

2. An apparatus as in claim 1, wherein:
said shifting means comprises a shifting screw element which threadably engages said centerpiece means and projects outwardly from said main housing through a sidewall thereof; and
said electric motor actuation means comprises a bidirectional electric motor mounted substantially perpendicular to said housing drive train, with minimum overhang relative said main housing, and adapted for rotating said shifting screw element in either rotational direction.

3. An apparatus as in claim 1, further comprising:
limit switch means, associated with said electric motor actuation means, for providing an upper and lower limit for said controlled shifting of said centerpiece means by actuation of said shifting means; and limit actuating means for actuating said limit switch means responsive to shifting of said centerpiece means relative said drive train.

4. An apparatus as in claim 3, wherein said limit actuating means comprises a spring-loaded rod-type member, biased towards an upper shoulder of said centerpiece means for resting on same and being moved therewith, and for actuating said limit switch means responsive to said shifting of said centerpiece means.

5. An apparatus as in claim 1, further comprising a protective shear pin for coupling said electric motor actuation means drive shaft with said shifting means, said shear pin self-destructing at a predetermined torque relative the continuous torque rating of said electric motor actuation means so as to protect same.

6. An apparatus as in claim 2, further comprising:
a terminal strip bracket secured to said electric motor and projecting outwardly from at least one side thereof; and wherein
said motor housing means defines a drive shaft opening for passage of said drive shaft therethrough; and further wherein
said torque arm means includes a torque arm securement element for securing the outwardly projecting portion of said terminal strip so as to define said torque arm means.

7. An apparatus as in claim 2, wherein:
an axial end of said electric motor drive shaft is co-axially received within a bore formed in one end of said shifting screw element; and
said thrust bearing means includes paired upper and lower bearing assemblies radially and axially disposed with radial clearance about said shifting screw element in the vicinity of said coupling thereof with said drive shaft; said bearing assemblies being separated by a retaining ring radially engaging said shifting screw element for rotation therewith, and axially captured by a bushing on one axial side thereof and a bearing housing on the opposite axial side thereof, each bearing assembly having a top and bottom race axially confining caged roller bearings; and further wherein the top race of said upper bearing assembly and the bottom race of said lower bearing assembly are frictionally held stationary by said bushing and said housing relative rotational movement of said shifting screw element, while the bottom race of said upper bearing assembly and the top race of said lower bearing assembly engage said retaining ring therebetween so as to be rotated with rotation of said shifting screw element.

8. An apparatus as in claim 1, wherein:
said power transmission means includes at least one pair of friction disks, one of which defines an output disk and the other an input disk; and said apparatus further comprises
an annular member having a plurality of evenly spaced serrations about the periphery thereof, said annular member being adapted for fitting to the outside diameter of said output friction disk for supplying tachometer indications related to the rotational speed of said main housing output.

9. An apparatus as in claim 2, further comprising a centerpiece means insert for removably and fixedly engaging an upper portion of said centerpiece means, and for threadably engaging said shifting screw element, said insert comprising softer material than said shifting screw element for accepting wear therebetween, whereby said centerpiece means insert may be periodically replaced without requiring replacement of said centerpiece means or said shifting screw element.

10. A mechanical variable speed drive apparatus, comprising:
- a main housing having a rotatable input and a rotatable output generally co-axially aligned along a drive train thereof, said input adapted to be powered;
- dry traction friction power transmission means, generally in axial alignment with said drive train, and respectively connected to said housing input and output for transmitting power therebetween;
- centerpiece means, disposed generally along said drive train and slidably mounted within said housing for controllable movement substantially perpendicular to said drive train thereof for varying the rotational power transmitted by said power transmission means between said housing input and output;
- shifting means, operatively associated with said centerpiece means and mounted generally perpendicularly to drive train, actuation of said shifting means resulting in controlled shifting of said centerpiece means substantially perpendicular to said drive train, whereby rotational speed of said housing output relative said input thereof is varied;
- controllable motor means having a drive shaft coupled in substantially axial alignment with said shifting means for rotating same to vary the rotation speed of said housing output relative said input thereof;
- motor housing means, fixedly supported on said main housing, for generally enclosing said motor means;
- torque arm means for providing limiting engagement between said motor means and said motor housing means for preventing rotation of said motor means during rotation of said drive shaft thereof, said motor means being supported only by said coupling with said shifting means and by said torque arm means so as to tolerate some degree of misalignment between said drive shaft and said shifting means by accepting some axial and radial movement of said motor means relative said motor housing means;
- motor limit switches, operatively associated with said motor means, for limiting the range of controlled shifting of said centerpiece means by actuation of said shifting means with said motor means; and
- a limit switch actuation element, biased towards an upper shoulder of said centerpiece means so as to move with same, for actuating said motor limit switches responsive to said controlled shifting of said centerpiece means;
- whereby mechanically-adjusted speed variation is controllably accompished within a defined range with a controllable motor means.

11. An apparatus as in claim 10, wherein:
said motor means comprises a reversible servomotor; and
said shifting means comprises a shifting screw element adapted for threaded engagement with said centerpiece means for moving same perpendicular to said drive train responsive to being controllably rotated by said motor means; and said apparatus further comprises
a protective shear pin for coupling said servomotor drive shaft with said shifting screw element, said shear pin self-destructively de-coupling said drive shaft from said shifting screw element whenever torque thereat exceeds a predetermined level; and
a thrust bearing arrangement, situated radially and axially about said shifting screw element and said drive shaft near coupling of same, and adapted for bearing thrust generated in either axial direction along said drive shaft and said shifting screw element by bi-directional operation of said servomotor.

12. An apparatus as in claim 10, wherein:
said limit switches include separate upper and lower limit switches; and
said limit switch actuation element includes a bar-type generally L-shaped member having one portion extending along the direction of said motor means drive shaft and another portion projecting perpendicular from said one portion, with a securement nut received on the lower end of said one portion for axially confining a spring received about said one portion, and said element being disposed so that said another portion thereof generally passes between said upper and lower limit switches, which switches include respective actuable elements which project into the pathway of movement for said perpendicularly-extending another portion of said limit switch actuation element.

13. An apparatus as in claim 12, wherein said upper and lower limit switches respectively have means for adjusting the position of their respective actuable elements relative the movement pathway of said limit switch actuation element, whereby the range of controlled shifting of said centerpiece element may be varied.

14. An apparatus as in claim 11, wherein:
said motor housing means defines a drive shaft opening for passage of said drive shaft therethrough; and
said torque arm means includes a terminal strip bracket secured to a lower portion of said servomotor and projecting as an arm outward therefrom; and wherein said apparatus further comprises
a securement screw, and surrounding spacer element, for generally fixing said projecting bracket arm a distance from said motor housing means, with an increment of relative movement permitted between said bracket and said motor housing for said tolerating of some misalignment between said drive shaft and said shifting screw element; said securement screw being received but not frictionally engaged by an opening in said bracket, and threadably engaged with said motor housing means for defining said torque arm means to prevent self-rotation of said servomotor during its operation.

15. An apparatus as in claim 10, further including a tachometer ring associated with said power transmission means, said tachometer ring having a plurality of evenly spaced serrations about the periphery thereof adapted for providing pulsating signals to circuitry for sensing the rotational speed of said main housing output.

16. A mechanical variable speed drive apparatus, comprising:
- a main housing having a rotatable input and a rotatable output generally co-axially aligned along a drive train thereof, said input adapted to be powered;

dry traction friction power transmission means, generally in axial alignment with said drive train, and respectively connected to said housing input and output for transmitting power therebetween;

centerpiece means, disposed generally along said drive train and slidably mounted within said housing for controllable movement substantially perpendicular to said drive train thereof for varying the rotational power transmitted by said power transmission means between said housing input and output;

shifting means, operatively associated with said centerpiece means and mounted generally perpendicularly to said drive train, actuation of said shifting means resulting in controlled shifting of said centerpiece means substantially perpendicular to said drive train, whereby rotational speed of said housing output relative said input thereof is varied, servomotor means, having a drive shaft axially aligned and coupled with said shifting means, for controllably changing the rotational speed of said housing output relative said housing input by controlling said shifting of said centerpiece means;

a servomotor housing supported on said main housing for receiving said servomotor means;

shear pin means for protectively coupling said servomotor means drive shaft with said shifting means, and selectively shearing at a predetermined torque level so as to de-couple said shifting means from said servomotor means and thereby protect same;

thrust bearing means for bearing thrust in either axial direction of said drive shaft and said shifting means, said thrust being generated by rotation in either direction of said servomotor means drive shaft;

torque arm means, providing limiting engagement for said servomotor means relative said apparatus, for preventing rotation of said servomotor means during rotation of said drive shaft thereof, while said servomotor means is otherwise supported on only an axial end of said drive shaft coupled by said shear pin means to said shifting means, whereby some axial and radial movement of said servomotor means relative said apparatus is accepted; and limit switch mean, responsive to said controlled shifting of said centerpiece means, for limiting operation of said servomotor means so that speed variation accomplished with said apparatus falls within a predetermined range.

17. An apparatus as in claim 16, further comprising:
a tachometer ring secured to the outer diameter of a rotating member of said power transmission means associated with said housing output, said tachometer ring having equally spaced teeth about the periphery thereof adapted for producing pulses for use in sensing rotational speed of the apparatus output.

18. An apparatus as in claim 16, wherein:
said shifting means comprises a rotatable shifting screw element threadably engaged with said centerpiece means for shifting same responsive to rotation of said screw element; and
said thrust bearing means includes upper and lower bearing assemblies radially and axially received about said shifting screw element and said drive shaft adjacent the coupling thereof, said bearing assemblies being axially separated by a snap ring and axially confined on respective ends by a bushing and a bearing housing, and wherein each of said bearing assemblies include top and bottom races axially capturing bearing elements therebetween.

19. An apparatus as in claim 16, wherein said torque arm means includes a bracket secured to said servomotor means and projecting arm-like therefrom, and further includes a fixing element for relatively fixing such projecting arm so as to prevent rotation of said servomotor means about its drive shaft during operation of said servomotor means.

20. An apparatus as in claim 16, wherein:
said limit switch means includes respective upper and lower limit switches positioned with axial displacement relative one another along an axis parallel to that of said servomotor means drive shaft, and having respective actuable elements which project into a common pathway also parallel to said axis of said drive shaft; and
said apparatus further comprises a spring-loaded limit switch actuation element, biased towards said centerpiece means for resting thereon and being moved thereby in said common pathway, for selectively actuating said upper and lower limit switches responsive to said controlled shifting of said centerpiece means.

21. An apparatus as in claim 20, wherein:
said torque arm means includes a bracket secured to said servomotor means and projecting arm-like therefrom, and further includes a fixing element for relatively fixing such projecting arm so as to prevent rotation of said servomotor means about its drive shaft during operation of said servomotor means; and
said servomotor housing generally encloses said servomotor means, said torque arm means, said limit switch means, and a portion of said actuation element, and wherein said fixing element is secured to said servomotor housing.

22. A dry traction, disc-type, mechanically-adjustable variable speed drive apparatus, comprising:
a main housing having a rotatable input and a rotatable output co-axially aligned along a drive train thereof, said input adapted to be powered;
first friction disc and ring means, mounted for rotation within said housing in axial alignment with said drive train, and respectively connected to said housing input and output;
a centerpiece element disposed within said housing generally parallel with said drive train and slidably mounted for controllable movement substantially perpendicular thereto;
second friction disc and ring means, rotatably mounted on opposing ends of said centerpiece element, and positioned adjacent said first friction ring and disc, respectively, and in contact therewith at a slight angle for establishing radii of contact areas therebetween which determine the rotation speed of said housing output relative said input thereof;
rotatable shifting screw means, threadably received in said centerpiece element and disposed generally perpendicularly to said drive train, for being controllably rotated to cause controlled shifting substantially perpendicular to said drive train of said centerpiece element and second disc and ring means thereon, whereby said radii of contact areas may be adjusted for varying the rotation speed of said housing output relative said input thereof;
a reversible electric motor mounted generally perpendicular to said main housing drive train, and having a drive shaft co-axially coupled by a destructible shear pin to said shifting screw means for rotatably driving same, said shear pin destructively de-coupling said drive shaft from said shifting screw means at a predetermined level of torque so as to protect said electric motor;

a motor bracket secured to said electric motor, and a securing element for engaging said bracket against limited relative movement thereof, whereby a torque arm arrangement is defined for preventing rotation of said electric motor during its operation while said electric motor is otherwise supported only at said drive shaft thereof, and further whereby some axial and radial movement of said electric motor is tolerated;

a thrust bearing arrangement radially and axially disposed about said shifting screw means and said drive shaft adjacent said coupling thereof, and generally including respective upper and lower bearing assemblies axially separated by a snap ring and axially confined by a bushing adjacent said electric motor, said thrust bearing arrangement automatically bearing thrust on one of said upper and lower bearing assemblies dependent on which axial direction said electric motor generates thrust in by operation thereof;

upper and lower electric motor limit switches, having respective actuable members for controlling the range within which said electric motor is permitted to shift said centerpiece element by driving of said shifting screw means; and an actuator, biased towards said centerpiece element for resting on same and moving therewith, said actuator extending into the vicinity of said limit switches for automatically actuating said actuable members of same responsive to shifting of said centerpiece element.

23. An apparatus as in claim 22, wherein said motor bracket further comprises a terminal strip for receipt of control and power wiring for operative association with said reversible electric motor.

24. An apparatus as in claim 22, further comprising an annular member secured to the outer periphery of said first friction ring means, said annular ring member having approximately 60 equally-spaced teeth about the periphery thereof adapted for providing tachometer-related signals concerning the output speed of said apparatus.

25. An apparatus as in claim 22, wherein said actuator comprises a spring-loaded generally bar-type L-shaped element, having a securement nut on the lower end thereof for axially capturing a spring providing said biasing of said actuator, and having a transversely-extending upper portion adapted for projecting in a pathway which traverses the actuable members for both said upper and lower electric motor limit switches.

26. An apparatus as in claim 22, further comprising:
a centerpiece element insert removably mounted at the top of said centerpiece element for threadably receiving said shifting screw means, said insert being formed of relatively softer material than said shifting screw means for accepting greater wear than said shifting screw means and said centerpiece element; and an electric motor housing for generally enclosing said reversible electric motor, and having at least one opening for passage of said electric motor drive shaft therethrough;

wherein said securing element is fixed for limiting engagement relative said motor housing so as to define said torque arm arrangement, while permitting some freedom of movement for said electric motor to accomodate mis-alignment between said drive shaft thereof and said shifting screw means.

27. A disc-type, mechanically-adjustable variable speed drive apparatus, comprising:

a main housing having a rotatable input and a rotatable output generally co-axially aligned along a main axis of said housing, said input adapted to be powered by a drive source;

a first friction disc and a first friction ring, both disposed for rotation within said housing in axial alignment with said main axis thereof, and respectively connected to said housing input and output;

centerepiece means slidably mounted within said housing generally parallel with said main axis thereof, for controllable movement substantially perpendicular to said main axis, with a second friction disc and a second friction ring rotatably mounted on opposing ends of said centerpiece means, and positioned adjacent said first friction ring and said first friction disc, respectively, in contact therewith at a slight angle for establishing predetermined radii of contact areas therebetween;

rotatable shifting screw means, threadably received in said centerpiece means and mounted generally perpendicularly to said main axis, for being rotated to controllable shift said centerpiece means and second disc and ring mounted thereon substantially perpendicular to said main axis, whereby said radii of contact areas between said first disc and second ring and between said second disc and first ring may be varied for adjusting the rotation speed of said housing output relative said input thereof;

controllable electric motor means, having a drive shaft positioned substantially co-axial with and coupled to said shifting screw means, for controllably rotating same so as to shift said centerpiece means;

motor housing means for receiving said motor means;

torque arm means providing limiting engagement between said motor means and said motor housing means for preventing self-rotation of said motor means during operation thereof, and whereby said motor means is supported only by said drive shaft thereof and said torque arm means for tolerating some axial and radial movement of said motor means relative the housing means thereof so as to accept some mis-alignment between said drive shaft and said shifting screw means; and thrust bearing means, associated with the coupling between said electric motor means drive shaft and said shifting screw means, for accepting thrust in either axial direction along said drive shaft and said shifting screw means caused by rotation in either direction of said motor means;

whereby mechanically-adjusted speed variation is controllably accomplished with an electrical device coaxial with said shifting screw means.

* * * * *